United States Patent Office 3,014,074
Patented Dec. 19, 1961

3,014,074
PROCESS OF PREPARING BORON
TRIALKYL COMPOUNDS
Herbert Jenkner, Hannover-Wuelfel, Germany, assignor to Kali-Chemie Aktiengesellschaft, Hannover, Germany, a company of Germany
No Drawing. Filed July 16, 1959, Ser. No. 827,466
Claims priority, application Germany July 19, 1958
1 Claim. (Cl. 260—606.5)

The present invention relates to an improved process of preparing boron trialkyl compounds.

Several processes of preparing boron trialkyl compounds are known. For instance, boron trioxide has been reacted with aluminum trialkyl compounds. However, the yields of boron trialkyl compounds obtained thereby are rather low. Alkyl boroxole compounds, such as butyl boroxol and ethyl boroxol have also been reacted with aluminum trialkyl compounds whereby boron trialkyl compounds with the same or different alkyl radicals are formed. This process, however, has the disadvantage that boron trioxide must first be reacted with a toxic and spontaneously inflammable boron trialkyl compound at a high temperature and under pressure whereby 1 mole of boron trioxide is reacted with 1 mole of a boron trialkyl compound. This reaction requires several hours.

It is one object of the present invention to overcome the difficulties described above and to provide a simple and effective process of preparing boron trialkyl compounds in a high yield and without the use of high temperature and pressure.

Other objects of the present invention and advantageous features thereof will become apparent as the description proceeds.

In principle the new and advantageous process according to the present invention consists in reacting activated boron trioxide with an aluminum alkyl compound. Activated boron trioxide is prepared, for instance, by dehydrating boric acid in a vacuum at 200–220° C. and reacting the resulting boron trioxide with alkyl esters of boric acid. Such esters, in contrast to boron trialkyl compounds, are not spontaneously inflammable and nontoxic. The activation proceeds at atmospheric pressure and at a low temperature. Instead of boric acid esters alkyl boric acid esters may also be used as activators.

It is highly unexpected that boron trioxide which ordinarily is a very stable and inert compound, can be activated by the addition of relatively small amounts of esters of boric acid to such an extent that aluminum alkyl compounds exert an alkylating effect thereon. The alkoxy groups of the boric acid ester incorporated into the boron trioxide lattice participate in the reaction with the aluminum alkyl compound so that the resulting reaction product is a very pure boron trialkyl.

It is of advantage to carry out the reaction in the presence of solvents or, respectively, of suspending agents. Especially suitable for this purpose have proved, for instance, hydrocarbons, such as mineral oils or paraffin oils, hexane, heptane, octane, decane, perhydrocumene, aromatic compounds such as xylene, toluene, benzene, and the like, or ethers, such as diethylene glycol dimethyl ether, dibutyl ether, cyclic ethers for instance, tetrahydrofuran, dioxane and the like, chlorinated hydrocarbons such as methylene chloride, chloroform and the like. Preferably also mixtures of the named solvents may be used.

Generally a small amount of the ester of boric acid is used as activator. Said amount, however, should be large enough to permit the reaction to proceed at a satisfactory speed of reaction. The preferred amounts of boric acid ester are about 30 mole percent calculated for the amount of boron trioxide used. However, smaller amounts, such as amounts of 15% to 25% or even larger amounts, such as 50% or more, may also be used.

The reaction temperature does not appear to be critical. On the contrary, it has been found that the reaction can be carried out at a temperature between about 20° C. and about 180° C.

The trimethyl ester of boric acid is the preferred activating ester used. Said ester can readily be prepared and, therefore, is quite inexpensive. However, esters of alkanols of a higher molecular weight, such as the tributyl borate or even higher alkyl borates are also suitable.

The following examples serve to illustrate the process according to the present invention, without, however, limiting the same thereto.

Example 1

83.5 g. of boron trioxide activated by the addition of trimethyl borate and having the approximate composition $B(OCH_3)_3 \cdot 3B_2O_3$ are dissolved in 600 g. of diethylene glycol dimethyl ether and are reacted with 212 g. of triethyl aluminum at a temperature of 75° C.

After refluxing for 30 minutes, triethyl boron and the solvent are distilled off from the reaction mixture. 145 g. of triethyl boron are obtained.

The theory is advanced, although the reaction is by no means limited thereto, that the reaction proceeds according to the following equation:

$3(CH_3O)_3B_7O_9 + 21Al(C_2H_5)_3 \rightarrow$ 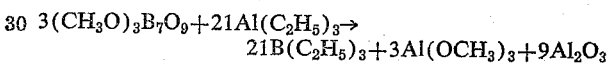
$$21B(C_2H_5)_3 + 3Al(OCH_3)_3 + 9Al_2O_3$$

Example 2

In place of trimethyl borate used in Example 1, there is employed the equimolecular amount of tri-n-butyl borate while otherwise the procedure is the same as described in the preceding example. Triethyl boron is obtained in about the same yield as in Example 1.

Example 3

In place of triethyl aluminum used in Example 1, there is employed the equimolecular amount of tri-n-butyl aluminum, yielding tri-n-butyl boron in about the same yield.

Example 4

420 g. of boron trioxide and 104 g. of trimethyl borate are dissolved in 1200 g. of diethylene glycol dimethyl ether. 1485 g. of triethyl aluminum are added to the mixture which is then heated under reflux for about 30 minutes. The solvent and the resulting triethyl boron are distilled off from the reaction mixture and are separated by fractional distillation.

Of course, many changes and variations in the boric acid esters and aluminum alkyl compounds used, in the solvents, diluting, or suspending agents employed, in the proportion of boron trioxide and boric acid esters present in the reaction mixture, in the reaction conditions, temperature, and duration, in the methods of working up the reaction mixture and of isolating and purifying the desired alkyl boron compounds, and the like may be made by those skilled in the art in accordance with the principles set forth herein and in the claim annexed thereto.

I claim:

In a process of producing triethyl boron, the steps which comprise dissolving boron trioxide, activated by the methyl ester of boric acid and corresponding approximately to the formula $B(OCH_3)_3 \cdot 3B_2O_3$, in diethylene glycol dimethyl ether, adding triethyl aluminum thereto at a temperature of about 75° C., boiling under reflux the reaction mixture until formation of triethyl boron is completed, and recovering the resulting triethyl boron and the solvent by distillation of the reaction mixture.

References Cited in the file of this patent

UNITED STATES PATENTS

| 2,853,526 | Perrine | Sept. 23, 1958 |
| 2,853,527 | Perrine | Sept. 23, 1958 |

FOREIGN PATENTS

| 1,028,120 | Germany | Apr. 17, 1958 |

OTHER REFERENCES

Goubeau et al.: Chem. Abs., vol. 46, p. 3893 (1952).